UNITED STATES PATENT OFFICE.

CHARLES B. AYERS, OF PHILADELPHIA, PENNSYLVANIA.

ARTIFICIAL STONE FOR ROOFING.

1,335,038.   Specification of Letters Patent.   Patented Mar. 30, 1920.

No Drawing.   Application filed April 19, 1915. Serial No. 22,390.

*To all whom it may concern:*

Be it known that I, CHARLES B. AYERS, a subject of the King of Great Britain, and a resident of Philadelphia, Pennsylvania, have invented certain new and useful Improvements in Artificial Stone for Roofing, of which the following is a specification.

My invention relates to artificial stone, intended particularly for use in sheets or shingle form for roofing and allied uses.

The purpose of my invention is to blend the qualities of lime with the water-resistant qualities of soapstone and the binding and fire-resistant qualities of asbestos fiber and to fill the combination with a relatively hard ingredient, such as silex or sand.

A further purpose of my invention is to distribute finely divided soapstone through lime to form a stone for the purpose of reducing the porosity and water-absorbing capacity and improving the surface resistance and polish of the resultant stone.

Further purposes of my invention will appear in the specification and claim hereof.

In my Patent No. 1,130,240 for an oxychlorid cement, I used soapstone and asbestos fiber in connection with magnesite and chlorid of aluminum to make roofing stone. I have discovered since filing that application, that the soapstone and asbestos fiber have similar though improved qualities in connection with lime, most desirable because it permits the cheaper grades to be used for a high grade product; in particular permitting use of lime, obtaining a better product for a lower price and giving the stone thus produced a capability for receiving a finish which shall not polish so much as it closes the surface openings or interstices.

The surface thus prepared is peculiarly susceptible to packing to form a very thin skin and at the same time the soapstone and asbestos fiber have much the same effect in permeation of the lime as grease would in preventing absorption of moisture, so that with the soapstone combination, a low grade lime may be used to obtain much the same effect as has previously been attained through hydraulic cement. The effect on the higher grade limes is also improved.

With the lime, soapstone and asbestos fiber, I use silex for the purposes of giving body and hardness to the sheets formed, reducing the expense and bonding the lime particles, whose adhesion is greater than their cohesion.

The bulk of my composition is intended to be lime, of which the best proportions known to me are 20 ounces to 2 ounces of asbestos fiber, 8 ounces of soapstone and 6 ounces of silex. All of these quantities can be changed somewhat, while securing some benefit. I have secured advantageous results with proportions of lime ranging from 14 to 25 ounces; of asbestos fiber ranging from 2 to 6 ounces; of soapstone from 4 to 10 ounces and of silex from 2 to 10 ounces.

It will be evident that the beneficial results obtained will be approached more nearly as the proportions given are approached, but that much variation is permissible while still obtaining part of the benefit of my invention.

The quantity of water used with the mixture will depend somewhat upon the proportions of the several parts used, the length of time after mixing before the sheets of the material can be formed and the methods of handling employed. It can be determined readily for any particular conditions by slight experimentation.

Having thus described my invention, what I claim as new and desire to secure by Letters Patent is:—

An artificial stone adapted to be used in sheet form, comprising lime, asbestos fiber, soapstone and silex in approximately the proportions indicated.

CHARLES B. AYERS.

Witnesses:
 WM. STEELL JACKSON,
 HARVEY VOID.